Patented Apr. 2, 1929.

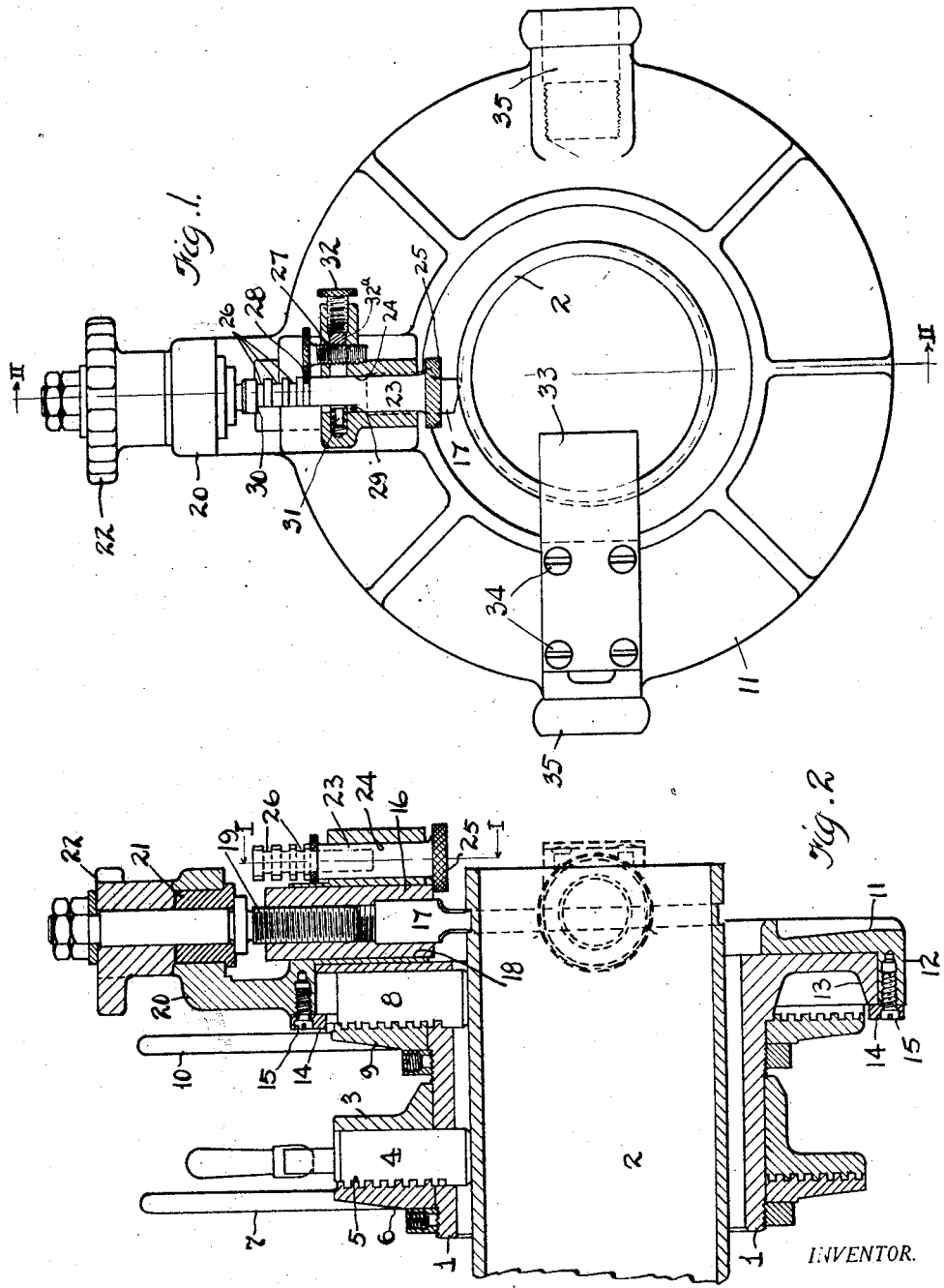

1,707,478

UNITED STATES PATENT OFFICE.

RALPH E. HYDE, OF CLEVELAND, OHIO, ASSIGNOR TO THE OSTER MANUFACTURING COMPANY, OF CLEVELAND, OHIO, A CORPORATION OF OHIO.

GROOVING TOOL.

Application filed July 18, 1927. Serial No. 206,482.

This invention relates to pipe-working tools and more particularly to devices for cutting grooves in the periphery of pipes and the like; and it is among the objects of the invention to provide a tool adaptable to operate on various sizes of pipe, it being readily changed from one size to another. A further object is the provision of an accurately controlled cutter feed. Other objects and advantages will appear as the description proceeds.

To the accomplishment of the foregoing and related ends, the invention, then, consists of the features hereinafter fully described, and particularly pointed out in the claims, the following description and the annexed drawing setting forth in detail a certain structure embodying the invention, such being illustrative however of but one of various ways in which the principle of the invention may be employed.

In said annexed drawing:—

Fig. 1 is an end elevational view of an embodiment of the invention, a detail being shown in section indicated by the line 1—1, Fig. 2; and Fig. 2 is an axial sectional view taken on a plane indicated by the line 2—2, Fig. 1.

In the form illustrated, the device includes in general an annular body member 1 within which a pipe 2 to be operated on is centered, and radially mounted in such member and in chuck guides 3 are centering chuck-jaws 4. The latter are of familar construction, being transversely grooved on one side as at 5 in coacting relation with a cam-ring 6 which is correspondingly grooved on spiral lines and rotatably or rather oscillably carried by the member 1. By means of an operating handle 7, the cam-ring may thus be swung to slide the jaws 4 in against a pipe or it may be swung reversely as desired. A further set of radial jaws 8 is similarly mounted and similarly actuated by a cam-ring 9 with its operating handle 10.

At the end of the member 1 is a rotatable head, this comprising preferably a face ring 11 with a flange 12 seating upon the expanded end-rim 13 of the body member 1. A retaining ring 14 secured by screws 15 to the flange 12 serves to prevent disengagement from the rim 13. Carried generally by the rotatable head and firmly secured by press fitting or otherwise directly in a sleeve 16 is a cutter or chaser 17, the sleeve being slidable in a radial guideway 18 formed in ring 11. The outer end portion of the sleeve 16 is screw threaded to receive an actuating screw 19, the outer end of the latter being in turn carried by a bracket 20 having a bearing bushing 21 mounted therein. A hand wheel 22 or the like secured to the end of the screw stem serves as actuating control means.

Adjacent the sleeve 16 is an adjustable stop, this comprising as shown a stem 23 mounted in a guideway 24 lying parallel with the sleeve and having at its inner end a projecting knurled head 25 disposed in the path of the sleeve, and having at its outer end a series of locking-grooves 26. Cooperative with the locking-grooves is a locking element in the form of a set screw 27 threaded in a boss on the guideway and having a head 28 adapted to seat within any selected one of the aforesaid grooves. One side of the stem 23 is cut away or flattened, such flattened face terminating in a shoulder 29 below and a shoulder 30 above. A spring-pressed plunger 31 is arranged to bear against such flattened face, so as normally to prevent rotation of the stem, although the latter may be forcibly turned by means of its knurled head 25, when desired. A second set screw 32 is desirably also arranged to press a keeper 32ᵃ against the set screw 27 in order normally to prevent rotation thereof.

In order to properly gauge the distance of the groove being cut from the end of the pipe-like article, an inwardly projecting stop finger 33 may be secured to the face of the ring 11 by screws 34 or the like; and arms made up of rod or pipe are received in the screw-threaded sockets 35 whereby the cutter carrying head may be rotated as in the manner of a pipe threading tool.

As will be readily understood, the pipe or like article to be grooved is inserted through the body member 1 to position against the stop 33, and the centering jaws are set up into position by swinging the cam-handles 7, 10. The member 23 carrying the stop 25 will be previously set to proper position, in accordance with the size of the pipe to be operated upon. In the illustration, provision is shown for stop adjustment adaptable to any one of four different sizes of pipe, and the particular setting indicated is that for the largest of those sizes. Such adjustment, as has been indicated is had by turning the stem 23 so as to bring its flat side opposite the head 28 of set screw 27, whereupon such stem may be slid up or down to bring the desired groove 26 thereon into alignment with such head and by now rotating the stem so as again to turn the flat side toward the plunger 31, the head 28 will be seen to engage the groove, thereby holding the stem and its stop-head 25 in the proper position for the desired pipe size. Any change of adjustment subsequently required may be similarly made. Ordinarily the first set screw 27 is held against movement by the second set screw 32; however in order to compensate for wear of the cutter and the like, such second set screw may be turned to release the first, and the latter may then be adjusted for such slight take-up in one direction or the other as may be required.

With the desired adjustment of the stop 25, it will be seen that the cutter-carrying head may be rotated, being swung around by the handles in the sockets 35 as in the manner of a pipe cutting die stock. The cutter 17 which is initially retracted a sufficient distance to clear the pipe, is fed inwardly by means of the hand wheel 22 as the operation proceeds, the sleeve carrying the cutter being brought finally to the limit of its movement against the stop 25 as set for that size of pipe, and thereupon the grooving is completed. The cutter is then run back and the pipe removed and another piece of pipe is brought into position.

As will thus be seen, the device as a whole presents a versatility of application as regards sizes of pipe or the like operable upon, and adjustments to any given size may be quickly made. Compensation for wear, etc., may also be had in a simple and accurate manner, and withal, the feeding of the cutter is characterized by positiveness and simplicity of operation which makes for serviceability and durable results.

Other modes of applying the principle of the invention may be employed, change being made as regards the details disclosed, provided the means stated in any of the following claims, or the equivalent of such, be employed.

I therefore particularly point out and distinctly claim as my invention:—

1. In a device of the character described, the combination of an annular body member; work-centering means carried thereby; an annular head rotatably mounted on said body member; a radial guideway on said head; a sleeve slidably mounted in said guideway; a cutter carried by said sleeve; a feed screw engageable within a threaded bore in said sleeve; a bracket externally of said guide on the rotatable head; a bearing bushing journaled in said bracket, the outer portion of said feed screw being journaled in turn in said bushing; an operating hand wheel on the outer end of said feed screw; a stop including a head projecting into the path of said cutter-carrying sleeve; a guide for said stop adjacent the sleeve; and means for adjustably setting said stop.

2. In a device of the character described, the combination of an annular body; work-centering means carried thereby; an annular head rotatably mounted on said body member; a stop-finger on the face of said rotatable head; a radial guideway on said head; a sleeve slidably mounted in said guideway; a cutter carried by said sleeve; a feed screw engageable within a threaded bore in said sleeve; a bracket externally of said guide on the rotatable head; a bearing bushing journaled in said bracket, the outer portion of said feed screw being journaled in turn in said bushing; an operating hand wheel on the outer end of said feed screw; a stop-head projecting into the path of said cutter-carrying sleeve; a guide for said stop adjacent said sleeve, and means for adjustably setting said stop, said means including a stem carrying the stop projection and having a series of grooves in its outer portion, a locking element for engaging in said grooves, said stem being flattened on one side to allow of axial adjustment relative to the locking element, and a binding shoe and set screw operating thereagainst for holding the locking element in adjusted position.

3. In combination with a disk-like member having a radial guideway therein, a sleeve reciprocably mounted in said guideway, a second guideway adjacent and parallel to said first guideway, a rod reciprocably mounted in said second guideway, a head formed on one end of said rod and projecting into the path of said sleeve, said rod being formed with a plurality of spaced circumferential grooves and having one side flattened throughout a portion of its length, and a headed screw mounted adjacent said rod, the head of said screw being adapted to enter selectively said grooves, said rod being rotatable to bring the flat side thereof into registry with said screw head to release the same from engagement in any one of said grooves.

4. In combination with a reciprocable member, a limit stop comprising a rod mounted in parallelism with said member and having a projection extending into the path of said member, one region in the length of said rod being formed with a plurality of spaced, circumferential grooves, and one side of said rod being flattened to the depth of said grooves in said region, and a headed screw adjustably mounted adjacent said rod, the head thereof being adapted to enter selectively said grooves, said rod being rotatable to bring the flat side thereof into registry with said head to release the same from engagement in any one of said grooves.

5. In combination with a reciprocable member, a limit stop comprising a rod mounted in parallelism with said member and having a projection extending into the path of said member, one region in the length of said rod being formed with a plurality of spaced, circumferential grooves, and one side of said rod being flattened to the depth of said grooves in said region, a headed screw adjustably mounted adjacent said rod, the head thereof being adapted to enter selectively said grooves, said rod being rotatable to bring the flat side thereof into registry with said head to release the same from engagement in any one of said grooves, and means to lock said screw in adjusted position.

6. In combination with a reciprocable member, a limit stop comprising a rod mounted in parallelism with said member and having a projection extending into the path of said member, one region in the length of said rod being formed with a plurality of spaced, circumferential grooves, and one side of said rod being flattened to the depth of said grooves in said region, a headed screw adjustably mounted adjacent said rod, the head thereof being adapted to enter selectively said grooves, said rod being rotatable to bring the flat side thereof into registry with said head to release the same from engagement in any one of said grooves, means resiliently retaining said rod in position with said flat side out of registry with said head, and means to lock said screw in adjusted position.

Signed by me this 12th day of July, 1927.

RALPH E. HYDE.